United States Patent Office 3,491,615
Patented Jan. 27, 1970

3,491,615
ACTUATORS
Desmond Ernest Hutchinson and Christopher James Dufton, Bradford, England, assignors to The English Electric Company Limited, London, England, a British company
Filed Jan. 24, 1968, Ser. No. 700,224
Claims priority, application Great Britain, Jan. 24, 1967, 3,452/67
Int. Cl. F16h 57/00
U.S. Cl. 74—625   10 Claims

ABSTRACT OF THE DISCLOSURE

This invention is concerned with an actuator including a motor connected by a gear to an output member and a manual drive member by which the output member can alternatively be driven, the motor drive being via a dog ring which is disengaged by the manual drive member when it is moved into driving engagement with the output member of the actuator.

---

This invention is concerned with actuators having an output member which can be driven either by a motor via a reduction gear, especially a worm gear, or directly by a manual drive member, for example a hand wheel.

An actuator according to this invention has an annular gear member formed with external gear teeth which mesh with a drive gear coupled to the motor; an output member coaxial with the annular gear member; a dog ring which is coaxial with the output member, is axially movable with respect to the output member and annular gear member while remaining in driving engagement with the output member, and is urged towards the annular gear member to a position in which it is in driving engagement with the annular gear member; and a manual drive member having a hub portion which extends into the actuator casing and which, in order to achieve manual operation of the actuator, is axially displaced and thus moves the dog ring out of engagement with the annular gear member and furthermore enters into driving engagement with the output member.

An example of an actuator according to this invention is shown in the accompanying drawings. In these drawings.

Figure 1:
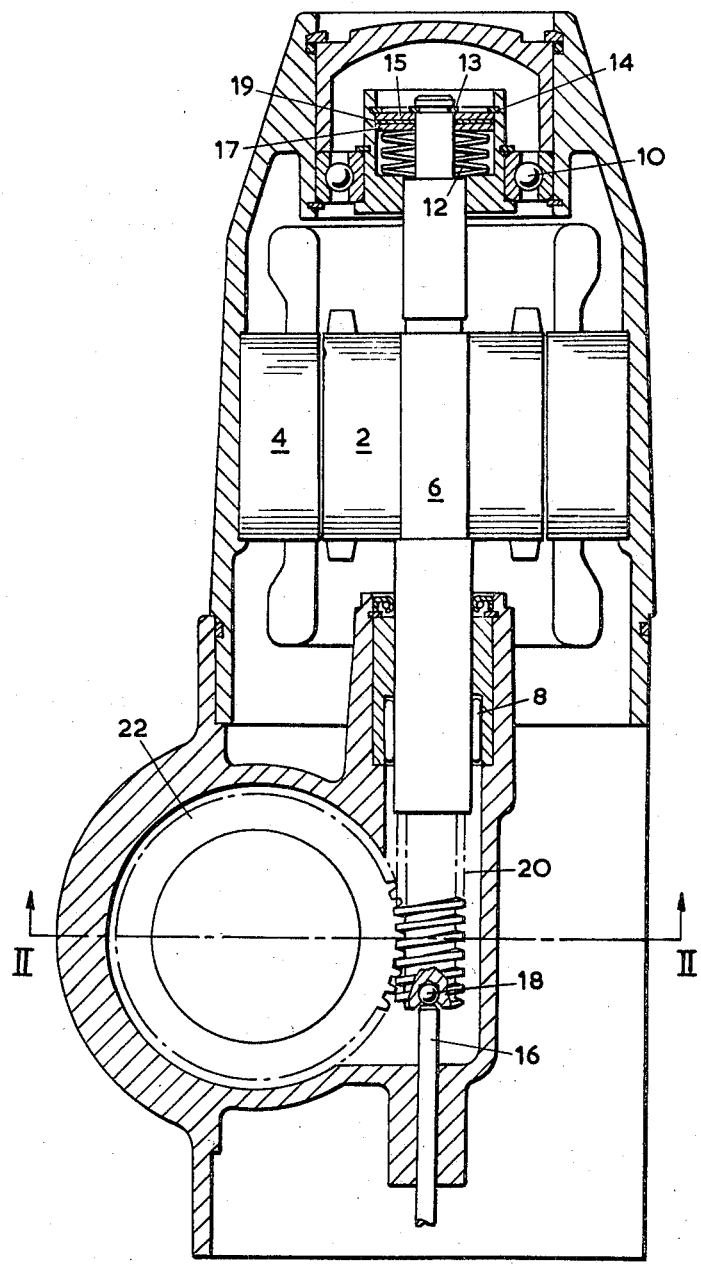
FIG. 1 is a cross-section on the line I—I in FIG. 2.

As shown in FIG. 1, the actuator includes an electric motor having a rotor 2 and a stator 4, the rotor being mounted on a drive shaft 6 which is supported by a roller bearing 8 near one end and by a ball bearing 10 which is situated at the other end and which incorporates a spring-centering arrangement locating the shaft 6 axially. The shaft 6 can move axially against the spring action of a stack of Belleville washers 12; such axial movement occurs, due to the engagement of a worm 20 on the shaft with a worm wheel 22, in the event of an excessive torque being demanded from the motor; when such axial movement occurs to a predetermined extent the motor is automatically cut out by torque-limiting switches (not shown) operated by a plunger 16 bearing on a ball 18 located in the end of the shaft 6. The Belleville washer stack is held in a precompressed state by circlips 13 and 14 with interposed slidable rigid washers 15 and 17 between which there are shims 19. It will be seen that axial movement in either direction is possible against the resistance of the Belleville washers.

Figure 2:
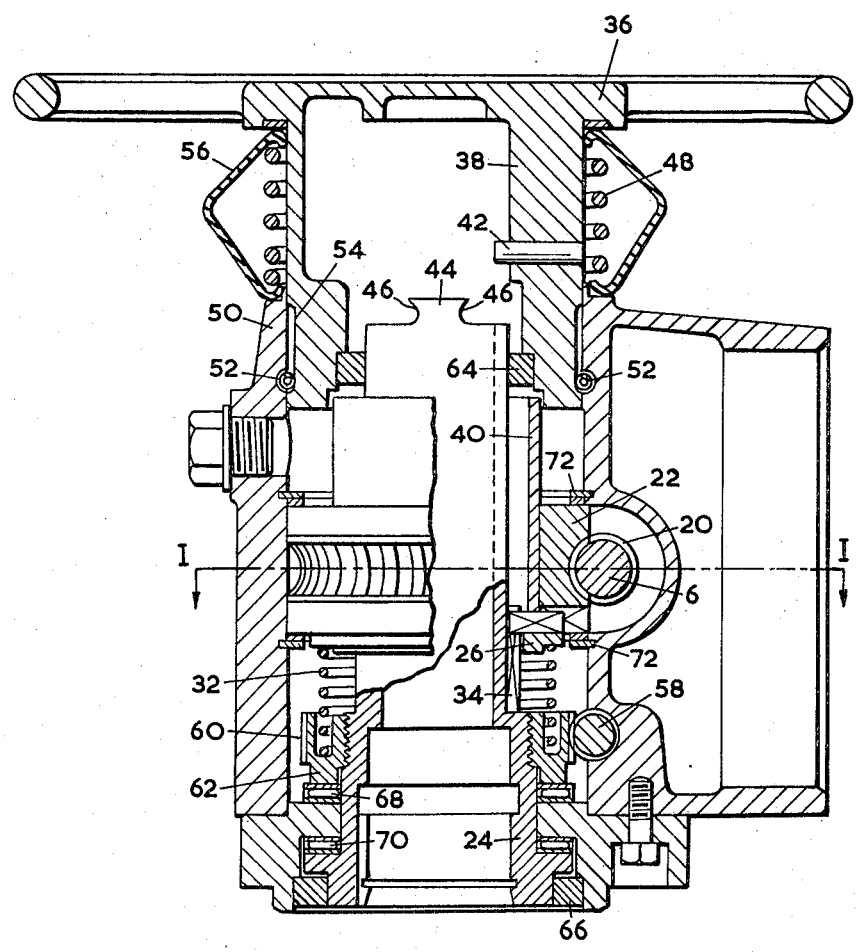
FIG. 2 is a section on the line II—II in FIG. 1, showing the output member being driven by the motor.

The worm wheel 22 serves as the annular gear member according to this invention. As shown in FIG. 2, the worm wheel 22 can drive a tubular output member 24 via a dog ring 26. For this purpose the dog ring has teeth 28 which are urged into recesses 30 in the worm wheel by a spring 32. The teeth 28 also extend radially inwards and engage permanently in longitudinal grooves 34 in the output member 24.

Figure 3:
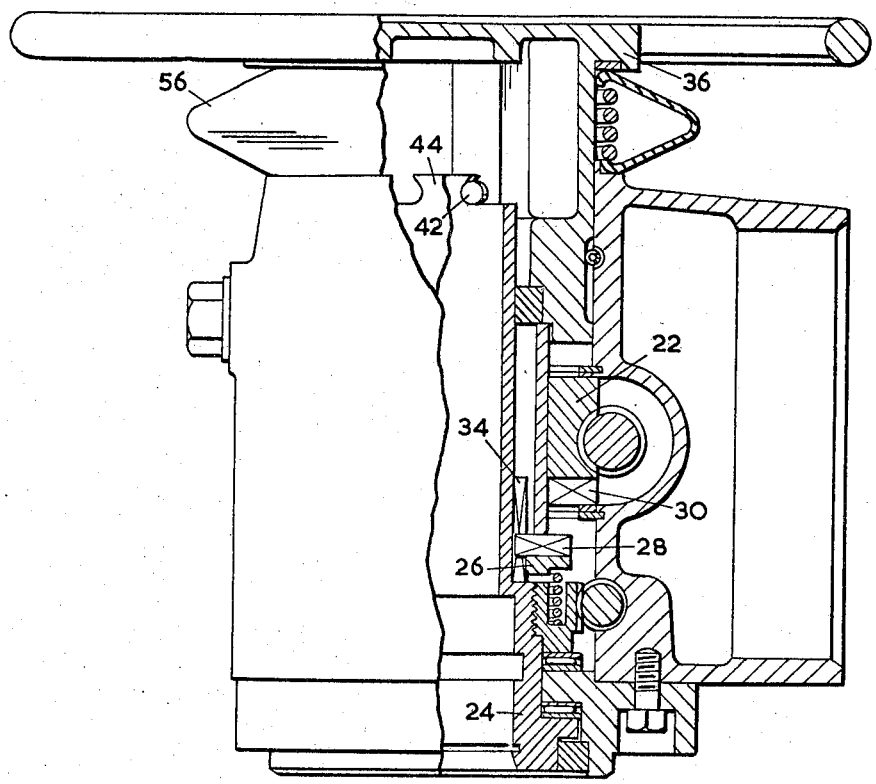
FIG. 3 is a section similar to FIG. 2 but showing the output member being driven by the hand wheel.

When the output member 24 is required to be driven manually, a hand wheel 36 is pushed downwards into the actuator casing 50 (as viewed in FIG. 2) to the position shown in FIG. 3. In this position a central hub portion 38 formed integrally with the hand wheel bears on a sleeve 40 and displaces the sleeve downwards, and the sleeve in turn pushes the dog ring downwards against the action of the spring 32 so as to carry the teeth 28 of the dog ring out of engagement with the recesses in the worm wheel. A direct drive from the hand wheel to the output member is achieved by means of two radial pins 42 in the hub portion which engage lugs 44 at the upper end of the output member. The sides 46 of the lugs are undercut so that the pins 42 inter-engage with the lugs and tend to hold the hand wheel in its "down" position while the hand wheel is being rotated. As soon as the hand wheel is released, a spring 48 pushes the hand wheel upwards so as to carry the pins 42 out of engagement with the lugs 44 and to permit the teeth of the dog ring to re-engage in the recesses in the worm wheel. The actuator is then ready to be operated again by the electric motor.

It will be seen that the pins 42 cannot engage the lugs 44 while the teeth on the dog ring are still in engagement with the worm wheel. In other words, as a safety precaution, it is impossible for the hand wheel to be driven by the motor.

The hand wheel is held in position with respect to the casing 50 of the actuator by a coil spring 52 which is inserted through a tangential opening in the casing (not shown) and is pushed in until it extends all the way around the output member. The coil spring serves as a stop and lies partly in a circumferential recess 54 in the hub portion 38 and partly in a circumferential groove of semi-circular section in the casing.

The spring 48 is covered by a flexible V-sectioned sheath 56.

Figure 5:
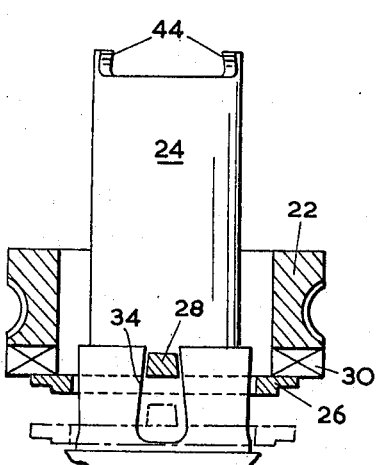
FIG. 5 is a side view of the main internal parts of the actuator with the casing removed and showing output after a 90° rotation.
Figure 4:
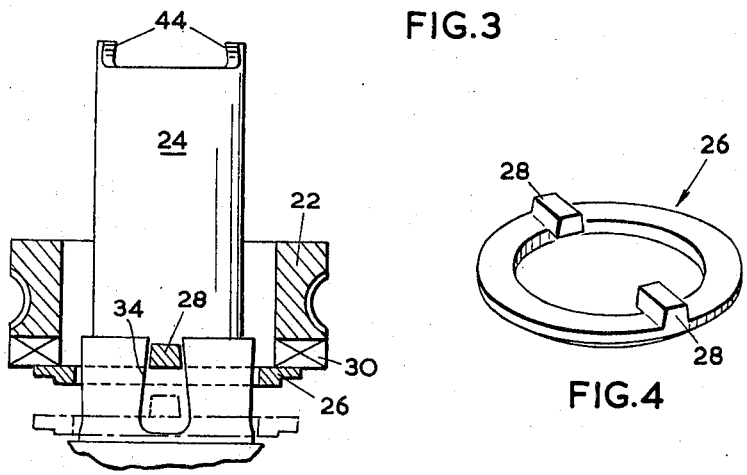
FIG. 4 is a perspective view of the dog ring.

As shown in FIG. 5, the sides of each groove 34 in the output member diverge in a downward direction. The angle of inclination of each side to the centre line of the groove (or in other words the inclination to a plane containing the axis of the output member) is chosen so as to be just slightly smaller than the friction angle for the materials concerned, so that the dog ring will not encounter an excessive frictional resistance to downward movement when the hand wheel is pushed downwards. Moreover this ensures that the resistance to downward movement (if any) will disappear once the initial movement has been made. If the sides of the grooves were parallel then, in the event of the teeth of the dog ring being firmly in engagement with the sides of the groove at the end of motor operation, there could be a considerable frictional resistance to downward movement of the hand wheel. The arrangement shown has the effect that, in the event of the teeth being still firmly in engagement with the sides of the grooves at the end of motor operation, there will only be a relatively slight frictional resistance to downward movement, and such resistance will be felt only against the initial downward movement, and after this initial movement has been made the hand wheel can be moved further without any difficulty.

The position of the output member may be transmitted to a position-indicating device by means of a shaft 58 which is formed with teeth inclined slightly to the axis of the shaft, these teeth being in engagement with a helical tooth (or helical teeth) 60 on a member 62 which is screwed onto the output member. As shown in FIG. 2, the spring 32 is seated in a groove in the member 62 at its lower end.

The output member 24 is surrounded by two seals 64 and 66 and is supported axially by two thrust bearings 68 and 70. The thrust bearings are necessary because the primary use for the actuator shown is in driving a screw jack. For this purpose a nut would be secured in the bottom end of the output member, and a screw would engage in the nut so as to move axially during rotation of the output member. As the output member is hollow, the screw can pass through it when necessary.

As shown in FIG. 2, the worm wheel 22 is located axially in the housing of the actuator by two circlips 72. As an alternative, the casing may have a machined shoulder to restrict upward movement of the worm wheel.

In the example illustrated the hub portion of the hand wheel displaces the dog ring by acting via the separate sleeve 40. It will be understood that the hub portion can alternatively be extended so as to act directly on the dog ring, for example by forming the sleeve 40 in effect as an integral part of the hub portion.

The hand wheel 36 may alternatively be made separable from the hub portion 38. In this case the hub portion may be inserted into the casing from below, as a first assembly step, and the coil spring 52 can be omitted because the hub portion can be formed with a shoulder to limit movement upwards out of the casing by engagement with an appropriately formed inner shoulder in the casing.

We claim:

1. An actuator comprising an annular gear member formed with external gear teeth which mesh with a drive gear coupled to a motor; an output member coaxial with the annular gear member; first and second driving engagement means on said output member; a dog ring which is coaxial with said output member and is axially moveable with respect to the output member while remaining in driving engagement with said first driving engagement means, and is urged towards the annular gear member to a position in which it is in driving engagement with the annular gear member; and a manual drive member having third driving engagement means and a hub portion which extends into the actuator casing and which, in order to achieve manual operation of the actuator, is axially displaced and thereby causes movement of the dog ring out of engagement with the annular gear member and engages said second and third driving engagement means.

2. An actuator according to claim 1, in which said second and third drive engagement means include, respectively, at least one notch in said output member and means on said hub portion arranged to engage in said notch.

3. An actuator according to claim 1, in which movement of said manual drive member towards engagement of said second and third driving engagement means causes the dog ring to disconnect completely from the annular gear member and only after further movement causes engagement of said second and third driving engagement means.

4. An actuator according to claim 1 in which the manual drive member displaces the dog ring by acting through an intermediate sleeve surrounding the output member.

5. An actuator according to claim 1 in which the dog ring surrounds the output member and has inwardly extending teeth engaging in longitudinal grooves or slots in the output member.

6. An actuator according to claim 5 in which the grooves or slots in the output member diverge in the direction in which the dog ring is moved to disengage from the annular gear member.

7. An actuator according to claim 1 in which the output member is hollow and carries a nut to cooperate with a screw which moves into and out of the output member during use.

8. An actuator according to claim 1, including a spring which urges said second and third driving engagement means out of engagement.

9. An actuator according to claim 8, in which said second and third driving engagement means interengage during manual operation so as to remain firmly in engagement as long as the manual drive member is being rotated.

10. An actuator including an annular gear member formed with external gear teeth; a motor driving a gear meshing with said external gear teeth on the annular gear member; an output member coaxial with the annular gear member; first driving engagement means comprising longitudinal recesses in the output member; second driving engagement means on said output member; a dog ring coaxially surrounding the output member and having axially extending dog tooth means releasably engageable in corresponding recesses formed in the annular gear member, and radially inwardly extending tooth means permanently engaging in said longitudinal recesses; first spring means urging the dog ring into engagement with the annular gear member; a manual drive member having a hub portion which is mounted for rotation coaxially with the output member and is movable axially, against the action of a second spring means, into direct driving engagement with said second driving engagement means; and including means operative to displace the dog ring axially out of engagement with the annular gear member, under the influence of the hub portion of the manual drive member while said hub portion is moving towards engagement with said second driving engagement means, said engagement with said second driving engagement means occurring only after the dog ring is completely disengaged from the annular gear member.

References Cited

UNITED STATES PATENTS

| | | | |
|---|---|---|---|
| 2,772,578 | 12/1956 | Kling | 74—625 |
| 3,026,744 | 3/1962 | Rouse | 74—625 |
| 3,198,033 | 8/1965 | Fry | 74—625 |

FRED C. MATTERN, Jr., Primary Examiner

W. S. RATLIFF, Jr., Assistant Examiner